Figure 1:
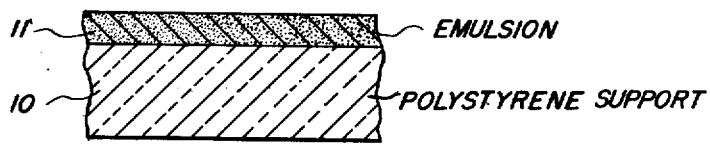

Dec. 10, 1957   T. H. FARRELL ET AL   2,816,027
PHOTOGRAPHIC ELEMENT HAVING A POLYSTYRENE SUPPORT
Filed April 22, 1954

THOMAS H. FARRELL
ROBERT E. KUGLER
DANIEL I. MAYNE, JR.
INVENTORS

BY
ATTORNEYS

United States Patent Office 2,816,027
Patented Dec. 10, 1957

2,816,027

PHOTOGRAPHIC ELEMENT HAVING A POLYSTYRENE SUPPORT

Thomas H. Farrell, Robert E. Kugler, and Daniel I. Mayne, Jr., Rochester, N. Y., assignors to Eastman Kodak Company, Rochester, N. Y., a corporation of New Jersey Application April 22, 1954, Serial No. 424,898

8 Claims. (Cl. 96—87)

This invention relates to a photographic element. More particularly, it relates to photographic elements having a support of polystyrene.

It has been previously proposed to employ various synthetic resins as supports for photographic elements. For example, it has been proposed to employ polyvinyl acetate, polyvinyl acetals, and the like for this purpose. However, such synthetic resins have not found extensive use due to physical characteristics which are not desirable in photographic film supports.

We have now found that polystyrene can advantageously be employed as a photographic film support. The polystyrene used according to our invention has particularly desirable properties, such as dimensional stability, which are particularly advantageous for certain purposes where shrinkage or swelling causes formidable problems.

Accordingly, it is an object of our invention to provide photographic supports comprising polystyrene. Another object is to provide subbing layers for such photographic supports. Still another object is to provide light-sensitive emulsions which are particularly useful in conjunction with these photographic supports comprising polystyrene. Other objects will become apparent from a consideration of the following description and examples.

Cellulose esters, such as cellulose acetate, have been previously used as supports for almost all photographic films. Such supports are subject to size change which results from the slow evaporation of residual solvent and/or the swell or shrink caused by water vapor. The amount of size change which occurs is sufficient to render such film unsuitable for certain types of precision work, such as the making of color separation negatives in photographic mechanical reproduction. While special supports have been used to avoid the size change mentioned above, they have been found to be unsuitable for various reasons. For example, glass plates are widely used, but they are expensive, heavy, fragile, dangerous and difficult to store. Other synthetic resins, such as the polyvinyl resins mentioned above, either fail to hold size sufficiently well to be of practical use, or are not available in continuous rolls of optically clear, flexible material suitable for sensitizing with a gelatinous emulsion.

The polystyrene film, which is employed as a photographic support according to our invention, is not subject to the disadvantages mentioned above. While polystyrene has been suggested as a photographic film support in the past, it has not found wide acceptance in the trade because of its brittleness. The polystyrene which we advantageously employ in our invention is not subject to this defect of brittleness. The polystyrene employed in our invention is flexible and has physical characteristics exemplified by the sheets identified as grade 1 and grade 2 in Table A which follows. In the table, L represents length and W represents width. The characteristics, except for birefringence, are commonly employed in the art for characterization of photographic film supports. See, for example, Fordyce et al. U. S. Patents 2,492,977 and 2,492,978. The birefringence test in Table A, which is characteristic of the polystyrene employed in our invention, is explained in some detail below. As shown in Table A, grade 3 polystyrene film would not be suitable as a film support for photographic elements, since it would be extremely brittle. Of course, it is a matter of common knowledge that ordinary polystyrene is characterized by such brittleness. However, polystyrene film having birefringence characteristics at least equal to those of grade 2 of Table A are adaptable for use in the present invention. That is, polystyrene film used in our invention should have birefringence characteristics such that $n_\gamma - n_\beta$ has a mean value of at least $+0.6$ $(10^{-3})$, $n_\beta - n_\alpha$ has a mean value of at least $-4.0$ $(10^{-3})$, and $n_\gamma - n_\alpha$ has a mean value of at least $-3.4$ $(10^{-3})$. As employed herein birefringence is defined as the difference in refractive index between the principal axes of the photographic film support. Further, $\alpha$ is the index normal to the plane of the photographic film, $\beta$ is the index 90° from the machine direction in the plane of the sheet, and $\gamma$ is the index along the machine direction in the plane of the sheet. The expression "at least" as used above and in the appended claims is without reference to the positive or negative value and is based solely on the number value. This can be readily seen by reference to the following table.

TABLE A

| Test | Grade 1 | | Grade 2 | | Grade 3 | |
|---|---|---|---|---|---|---|
| | L | W | L | W | L | W |
| Specific Gravity | 1.049 | | 1.049 | | 1.050 | |
| Birefringence $(10^{-3})$: | | | | | | |
| $n_\gamma - n_\beta$ {mean | +2.7 | | +0.6 | | +0.05 | |
| {range | +2 to +3.5 | | +0.3 to +0.8 | | 0.0 to +0.1 | |
| $n_\beta - n_\alpha$ {mean | −9.3 | | −4.0 | | −0.4 | |
| {range | −7 to −11 | | −3.5 to −4.5 | | −0.2 to −0.5 | |
| $n_\gamma - n_\alpha$ {mean | −6.6 | | −3.4 | | −0.3 | |
| {range | −5 to −8 | | −3.0 to −4.0 | | −0.2 to −0.4 | |
| Schopper Folds, 1 Kg., 50%: | | | | | | |
| mean | 55 | 75 | 20 | 35 | 0 | 0 |
| range | 30–70 | 60–85 | 15–25 | 25–50 | | |
| Tear (Research): | | | | | | |
| mean | 18 | 17 | 29 | 22 | 0 | 0 |
| range | 15–25 | 15–20 | 26–31 | 20–23 | | |
| Tensile at Break, $10^3$ p. s. i., mean | 11.7 | 11.6 | 10.4 | 10.5 | 6.1 | 6.6 |
| Percent Elongation at Break, mean | 3.9 | 3.7 | 3.6 | 4.1 | 2.0 | 2.5 |

The polystyrene film base employed in our invention can advantageously be prepared according to methods known in the art. See, for example, Studt et al. U. S. Patent 2,074,285, issued March 16, 1937.

The polystyrene sheeting employed in our invention can be subbed before coating with a photographic emulsion, if desired. However, for certain purposes it is not necessary to sub such sheeting, especially where the photographic element is to be employed at comparatively high relative humidity.

The following examples will illustrate the manner of preparing subbing layers for the polystyrene sheeting of our invention.

Example A

Polystyrene sheeting having the characteristics illustrated by grade 1 in Table A and a thickness of approximately 0.005 inch was coated with a solution of the following composition:

4.5% of a 50–50 mixture of poly-n-butyl methacrylate and polyisobutyl methacrylate.
25.0% methanol.
3.05% n-butanol.
67.45% #1 Naphtha solvent.

This was followed by a coating of the following composition:

2.15% cellulose nitrate containing approximately 11% nitrogen (high alcohol solubility).
8.7% β-methoxyethanol.
5.2% n-butanol.
25.0 #1 Naphtha solvent.
58.95% methanol.

The subbing was completed with application of a solution of the following composition:

1.2% gelatin.
1.0% glacial acetic acid.
13.0% water.
10.0% β-methoxyethanol.
74.8% methanol.

The subbed polystyrene sheeting was then coated with an ordinary photographic gelatino-silver-halide emulsion, such as a photographic gelatino-silver-bromiodide emulsion.

Example B

Polystyrene sheeting was coated in the same manner as described in Example A with the solution of the methacrylate resins. In place of the two separate applications which followed, a single application was made of the following composition:

1.25% gelatin.
1.25% cellulose nitrate containing approximately 11% nitrogen (high alcohol solubility).
1.0% glacial acetic acid.
1.5% chromic chloride (based on amount of gelatin rather than total composition).
3.5% water.
50.0% acetone.
Balance methanol.

The polystyrene sheeting was then coated with an ordinary gelatino-silver-halide emulsion.

Other coating compositions can obviously be employed for subbing the polystyrene sheeting employed in our invention. Resins other than polymers of methacrylic esters can be employed and resins other than cellulose esters can be employed. Also, the amounts of components in the subbing compositions can be varied, depending on the use to which the photographic element is to be put. Particularly advantageous results have been obtained using resin layers containing polymethacrylate resins as described in Examples A and B.

The polystyrene film base can be coated with conventional photographic silver halide emulsions as described in Examples A and B above. Typical photographic silver halide emulsions include silver chloride, silver bromide, silver iodide, silver bromiodide, silver chlorobromide, silver chlorobromiodide, etc. emulsions. The carrier for the silver halide can be gelatin, synthetic resins, albumen, etc.

We have also found that particularly advantageous results can be obtained when photographic silver halide emulsions are employed wherein the carrier is other than gelatin. For example, photographic silver halide emulsions wherein the carrier is a dicarboxylic ester of ethyl cellulose, have been found to be particularly useful. Dicarboxylic acid esters of ethyl cellulose have been found to be particularly advantageous in that they provide further dimensional stability to the photographic element, which is quite important where it is desired to use the photographic element in photomechanical reproduction. Since such photomechanical reproduction calls for numerous and prolonged treatment in aqueous solutions, some of which are strongly alkaline, it is desirable to have a photographic film which undergoes as little change as possible when subjected to such conditions. Photographic silver halide emulsions dispersed in dicarboxylic esters of ethyl cellulose have been previously described in Talbot and McCleary U. S. application Serial No. 279,918, filed April 1, 1952, now U. S. Patent 2,725,293, issued November 29, 1955. The following examples will illustrate in some detail the manner of applying these dispersions of silver halide in dicarboxylic acid esters of ethyl cellulose to the polystyrene film base of our invention.

The ethyl cellulose phthalate which is employed is in the form of its salt, such as the ammonium salt, the amine salt (either primary, secondary or tertiary), or, in some cases, in the form of the alkali metal salts thereof. These emulsions are ordinarily prepared by mixing the ethyl cellulose pythalate salt with the silver halide after it has been prepared in a peptizer so as to be in dispersed form. In some cases it may be desirable to mix the salt of ethyl cellulose phthalate with the peptized silver halide, and immediately coat the resulting composition upon the support. In other cases it may be desirable to mix the carrier with the peptized silver halide and coat either at the time or allow standing for a certain length of time. The silver halide grains may be prepared using any commonly employed peptizer therefor, as is well known in the art. As a peptizer for the silver halide, the ethylenediamine salt of ethyl cellulose phthalate can be employed, and the emulsion may be prepared therefrom by mixing therewith as the carrier either more of the same type of salt with the silver halide dispersion so prepared or one of the other salts of ethyl cellulose phthalate. Another type of peptizer which has been found to be useful for preparing silver halide dispersions is the gelatin derivative type, such as phthalic anhydride derivatives of gelatin, as disclosed and claimed in U. S. Patent No. 2,525,753, of Yutzy and Frame, or gelatin derivatives as disclosed in application Serial No. 768,475 of Yutzy and Frame, filed August 13, 1947 (now U. S. Patent 2,614,928, issued October 21, 1952). This peptizing material is compatible with ethyl cellulose phthalate salts and, upon mixing therewith, the resulting emulsion obtained may be allowed to remain in storage for any period desired. Other peptizers which may be employed in preparing the silver halide dispersions may be gelatin, oxidized protein derivatives or oxidized proteins as described in Lowe and Gates application Serial No. 768,480 (now U. S. Patent 2,691,582, issued October 12, 1954), filed August 13, 1947, or ethanol amine cellulose ester compounds. In cases where the peptizing material employed is not highly compatible with the ethyl cellulose phthalate salt, it is desirable that the coating operations take place very soon after the mixing of that carrier with the peptized silver halide dispersion.

In the coating of photographic emulsions in accordance with the instant process, the emulsion is at a temperature lower than that to which the coating is subjected after it has been applied to the support therefor. For instance, the cellulose ether phthalate salts as employed in the instant process are water-soluble, but insoluble in water at elevated temperatures, the solution temperature depending upon the particular cellulose ether phthalate employed. Therefore, it is preferred to dissolve the cellulose ether phthalate salt and prepare the photographic emulsion therefrom under cold conditions and, after coating, then apply a higher temperature thereto, such as by the use of hot air, which immediately sets the coating.

The following is an example of the behavior of a typical cellulose ether phthalate useful in the instant process: An ethyl cellulose, having an ethoxyl content of approximately 45%, was phthalylated according to the method described in U. S. Patent 2,093,462 to give a cellulose ether phthalate having an apparent phthalyl content of 16.8%. This compound had a viscosity, when made into a 3% solution in ethyl alcohol (70%), isopropyl alcohol (20%), n-butyl alcohol (10%) of 7.4 cps. 40 grams of the dry cellulose ether phthalate was added to 960 cc. of distilled water, and the slurry formed was cooled to 40° F. Ammonium hydroxide was added drop-wise with stirring until solution was effected. The clear, filtered solution had a pH of approximately 8.0. It was found that this solution had its lowest viscosity at a temperature of 62° F. When the temperature is increased, the viscosity of the solution rises sharply, and shortly beyond 66° F. the solution sets to a firm gel. This gel can be dried in a strong current of warm air at a dry and wet bulb temperature wherein the wet bulb temperature is at least the setting temperature of the cellulose ether phthalate. For example, it may be convenient to dry the gel at 100° dry bulb and 67° wet bulb temperature. If rapid drying is desired, a dry bulb temperature of 130° F. and a wet bulb temperature of 80° F. can be employed. If desired, wetting agents can be added to the coating solutions to bring about an even wetting of the surface to be coated, although as contrasted with the conventional gelatin solutions, the salts of cellulose ether pthalate do not require the use of such wetting agents since the solutions themselves readily wet most surfaces. In the use of cellulose ether phthalate as the carrier for silver halide, the addition of hardeners is unnecessary, as the vehicle in its free acid state is almost completely unaffected by water, either in the vapor or liquid form. If water of a basic character (hard water) is employed, there may be conversion of some of the vehicle to the form of a salt, which would render the vehicle more susceptible to the effect of water, particularly at low temperatures. In such a case, prehardening of the vehicle may be desirable.

In the preparation of light-sensitive silver emulsions, it is customary to react silver nitrate with a halide salt, such as potassium bromide, in the presence of a colloidal material. It is often desirable to remove the excess of soluble salts present by means of washing. With a gelatin vehicle, this washing is accomplished by setting the emulsion to a gel by chilling, forming noodles thereof and washing these noodles in cold water. This method is slow and costly, and some silver and gelatin are lost in the proceeding. In the case of a cellulose ether phthalate emulsion, the noodling is accomplished by forcing a thin stream of the liquid emulsion into dilute aqueous acid, such as dilute acetic acid. The emulsion precipitates in a thread-like form which is susceptible to being washed in a stream of water of any desired temperature. The soluble salts therein are thereby removed without any loss of silver or cellulose ether phthalate. After this washing operation, the emulsion coating may be carried out by chilling the washed noodles of emulsion, adding a small amount of water containing dilute alkali, and then adjusting the resulting solution to give the correct silver content and viscosity. When the emulsion is free of bubbles, it is ready for coating.

In the coating of emulsions in accordance with our invention, there is some slight difference in behavior, depending on the base used to form the salt. In general, we prefer to employ ammonium or organic amine salts of the cellulose ether phthalate. In the case of the ammonium salt of the cellulose ether phthalate, the drying operation in the coating of the emulsion layer liberates the ammonia therefrom so that the free acid form of the cellulose ether phthalate is obtained. Thus, with the polystyrene supports of our invention, a dried film is obtained having an emulsion layer thereon which is no longer water soluble. Because of this characteristic, ordinarily the use of the ammonium or organic amine salts is preferred for preparing emulsions to be used in conjunction with the polystyrene film base of our invention. Although ethyl cellulose phthalate is soluble, as a rule, in cold water having an alkaline pH, nevertheless emulsion layers can be processed in the conventional alkaline developer solutions without any undue softening or disintegration taking place. Also, emulsion layers containing the cellulose ether phthalate are not susceptible to the effect of high humidity nor do they support the growth of mold as characterizes gelatin emulsions. In addition, the emulsion layers in accordance with our invention show a high degree of flexibility over a wide humidity range and there is no tendency to cause curling as a result of changes of humidity conditions.

The following table illustrates the improvement obtained according to our invention when the subbed polystyrene film base, having the characteristics defined above, is coated with a photographic silver halide emulsion containing a dicarboxylic acid ester of ethyl cellulose as the vehicle.

TABLE B

| Sample | | Dev. Shrinkage | Percent Size Change Between 20% R. H. and 70% R. H. at 70° F. | Percent Size Change After 3 Months | | |
|---|---|---|---|---|---|---|
| | | | | 78° F. 60% R. H. | 90° F. 20% R. H. | 90° F. 90% R. H. |
| A | length | .03 | .25 | +.03 | +.03 | −.21 |
| | width | .04 | .23 | −.01 | −.02 | −.33 |
| B | length | .03 | .05 | −.01 | −.01 | −.02 |
| | width | .01 | .04 | .00 | +.01 | −.01 |
| C | length | .00 | .01 | −.02 | −.03 | −.03 |

In the table, sample A is an ordinary cellulose ester sheeting, e. g. cellulose acetate, having coated thereon a standard photographic silver halide emulsion having gelatin as the vehicle. Sample B is a photographic element having a polystyrene film base, as illustrated by grade 1 or grade 2 in Table A above, having coated thereon an ordinary gelatino-silver-halide emulsion. Sample C is a photographic element having a polystyrene film base, as illustrated by grade 1 or grade 2 in Table A above, having coated thereon a cellulose ether phthalate emulsion as described in the Talbot and McCleary U. S. application Serial No. 279,918, now U. S. Patent 2,725,293. In the first column of the table, the amount of shrinkage (percent) following regular or conventional photographic development is shown. The second column shows the change occurring over a humidity range at 70° F. The remaining columns show the change which occurs after keeping for three months at various conditions of temperature and humidity. In all instances, it is clear that Sample C has superior properties insofar as dimensional stability is concerned.

In the development of emulsions using a cellulose ether phthalate vehicle, it has been found that, although this vehicle is impervious to the action of neutral and acidic solutions, this material is changed by the alkali of a developer into a water permeable material, and consequently upon development the action on the silver grains proceeds at once and the development time is the same or even less than that of the same kind of grains dispersed in gelatin. It is preferable in fixing emulsion layers that a neutral rather than an acid hypo solution be employed for this purpose. After the desired fixing has been accomplished, the emulsion can then be immersed in aqueous acid, such as dilute aqueous acetic acid, for a minute more or less to convert the cellulose ether phthalate to the water insensitive form. The moisture content of the emulsion layer is appreciably reduced thereby, and after this treatment the film containing the emulsion layer may be washed in water in normal fashion. Due to the decrease of the moisture content of the emulsion in the acid bath, the washed film is so nearly dry that it may be used for some purposes after merely blotting off the surface moisture. As a negative, contact prints may be made therefrom immediately without damage to the emulsion layer. As an X-ray film, diagnosis can be made immediately after processing without the precautions ordinarily necessary in the case of gelatin emulsions.

The temperature at which photographic emulsions exhibit minimum viscosity on one hand, and setting on the other, varies from one cellulose ether phthalate to the other. For instance, it may be stated as a generality that the higher the ethoxyl content, the lower the temperature necessary to dissolve the cellulose ether phthalate, whereas the higher the phthalyl content, the higher the temperature necessary for setting the solution of the ether phthalate and the less critical the setting temperature becomes. Also, the setting point of the cellulose ether phthalate solution will vary with the concentration thereof. For instance, with a solution of 5% concentration, the setting point of a given cellulose ether phthalate will be several degrees lower than that of a solution of 3% concentration. As a rule, it is preferred to operate near a ratio of 5:1 cellulose ether phthalate solution to concentrated silver halide dispersion when the cellulose ether phthalate is about 5% concentration in water and the concentrated silver halide contains about 2% of peptizer with 1 mol. of silver halide therein per liter of solution. It is desirable that sufficient ethyl cellulose phthalate be employed as a carrier for the silver halide to obtain an emulsion coating on the polystyrene support when the emulsion is applied thereto so as to obtain a photographic product.

It is desirable that the cellulose ether phthalates employed be prepared from ethyl cellulose having an ethoxyl content of at least 42%. When a cellulose ether having an ethoxyl content of about 42% is used to prepare the cellulose ether phthalate, it is desirable that the ether phthalate contain at least 5% phthalyl, the preferred range for phthalyl content for a cellulose ether phthalate so prepared being 8–15%. When a cellulose ether having an ethoxyl content of 47.7% is used as the starting material, a phthalyl content of at least approximately 11% has been needed to get a product whose salts are soluble in cold water. It has been found that the preferred range of phthalyl to impart to cellulose ethers of this type is within the range of 11–17%. When cellulose ethers having a still higher ethoxyl content, such as 49.5%, are used to prepare ether phthalates, few hydroxyl groups are present in the cellulose ether, and therefore the amount of phthalyl which can be incorporated is limited. In this case, 16.5% phthalyl is approximately the limit of phthalyl which can be incorporated, but at least approximately 12% of phthalyl should be imparted for solubility of the ether phthalate salts in cold water. The cellulose ether phthalates employed may vary also as to viscosity. It has been found that in the case of low viscosity esters, such as those whose salts have a viscosity of less than 10 cps. in 4% solution in water, it is usually desirable to incorporate some plasticizer, such as triacetin or polyethylene glycol in the cellulose ether phthalate composition. In the case of higher viscosity esters, plasticizer is usually unnecessary.

In applying emulsion layers in accordance with our invention using cellulose ether phthalate, it is preferred that the layer have a thickness when dry of at least .00035 of an inch for cine positive film. With other types of photographic products, the emulsion layer has a dry thickness from .0001 to .001 inch or more. For applying on film base, it is desirable that that base be first subbed with a layer which promotes good adhesion.

The following examples will serve to illustrate the manner of preparing the cellulose ether phthalate emulsions which can advantageously be employed in our invention.

Example 1

2 parts of starch acetate were dissolved in 30 parts of distilled water, warming gently. The solution was cooled to 40° F. and there was then added thereto simultaneously in slow streams and with vigorous stirring 10 parts of a silver nitrate solution and 10 parts of a solution of potassium bromide and iodide. The silver nitrate solution had been made by dissolving 100 grams of silver nitrate in 200 cc. of distilled water. The second solution had been made by dissolving 76 grams of potassium bromide and 2.4 grams of potassium iodide in 200 cc. of distilled water. The preparation of the silver halide and the remaining steps in this example were carried out under darkened conditions.

The resulting product which comprised grains of silver halide dispersed in the starch acetate solution was mixed with 50 parts of a 5% solution of the ammonium salt of ethyl cellulose phthalate, the temperatures of both solutions being at approximately 50° F. The cellulose ether phthalate employed was the result of phthalylating a cellulose ether having an ethoxyl content of 45% to a point that a phthalyl content of 19.8% was present therein. The suspension of silver grains in cellulose ether phthalate obtained was then forced through a small glass tube into dilute acetic acid, thus producing a thread-like precipitate of the acid form of the cellulose ether phthalate carrying the silver halide grams. This precipitate was washed in a stainless steel wire basket with water until the wash water which resulted no longer gave a test for soluble halides. The precipitate was then partially dried and was mixed with 100 parts of distilled water containing 1 part of starch acetate therein. The slurry thus obtained was cooled to 55° F., and sufficient ammonium hydroxide was added thereto to convert the cellulose ether phthalate into the form of its phthalyl ammonium salt, thus resulting in dissolution of the silver halide emulsion.

Example 2

.5 part of a cellulose ether phthalate, which had been prepared by phthalylating ethyl cellulose having an ethoxyl content of 45% to a phthalyl content of 16.8%, was suspended in 34 parts of distilled water. The resulting suspension was cooled to 40° F., and, while agitating, ethylenediamine was added drop-wise thereto until solution was effected. There was then added simultaneously to the solution, while vigorously agitating, 17 parts of a potassium bromide solution and 17 parts of a solution of silver nitrate, these solutions having been prepared in the manner described for the preparation of the corresponding solutions in Example 1. This mixture was stirred for 1 minute and there was then added with stirring 100 parts of a 4% solution of the ammonium salt of a cellulose ether phthalate of the same type as employed in the preceding example. The emulsion thus obtained was precipitated in thread-like form into dilute acetic acid, as described in Example 1, and the precipitate was washed with warm water, drained and dissolved in cold water made alkaline with $NH_4OH$. The emulsion was diluted to give a readily flowable viscosity.

Example 3

A dispersion of silver halide was prepared as follows, using as the peptizer a phthalic anhydride derivative of gelatin prepared by reacting 100 parts of gelatin with 5 parts of phthalic anhydride by the method described in Example 1 of the Yutzy and Frame U. S. Patent No. 2,525,753. The following solutions were prepared:

Solution A.—25 parts of the gelatin derivative, 141 parts of potassimum bromide and 1.3 parts of potassium iodide in 1500 parts of water at 60° C.

Solution B.—170 parts of silver nitrate in 1800 parts of water at 62° C. Solution B was run into agitated solution A over a period of 2 minutes. This step and the remaining steps of preparing and coating the emulsion were carried out under darkened conditions. The dispersion was cooled to 35° C., and there was added thereto 16¼ parts of 2 normal $H_2SO_4$ lowering the pH to 2.95. The mass was allowed to settle and was decanted. 400 parts of water were added to the coagulum which had been obtained, and the whole was stirred for 5 minutes at 40° C. at a pH of 4.1. The solid particles were again allowed to settle and separated from the liquid by decanting. The solid material was then dispersed at 45° C. with 2.5 normal NaOH for 35 minutes with the pH adjusted to 6.4. The final volume was adjusted to 500 parts by adding water thereto. Also, there was added 0.009 part of allyl thiourea in 18 parts of methyl alcohol, and the mass was heated for 35 minutes at 65° C. It was then cooled to 40° C., dispersed with an equal volume of water and was mixed with a 5% solution of the ammonium salt of a cellulose ether phthalate using 5 parts of the ethyl cellulose phthalate solution to 1 part of the silver halide dispersion, with the temperature of the dispersion 65° F., and that of the cellulose ether phthalate solution 50° F. The cellulose ether phthalate employed was one which had been prepared from an ethyl cellulose having a 45% ethoxyl content to which had been imparted a phthalyl content of 14.3%. The emulsion was thoroughly mixed in a centrifugal mixer.

*Example 4*

A silver halide dispersion was prepared as described in Lowe and Gates, Serial No. 768,480, by a peptizing agent prepared by reacting upon casein at an alkaline pH with acetic anhydride and acrylonitrile, whereby acetyl and acrylonitrile groups are introduced into the casein, followed by oxidizing the product with dilute hydrogen peroxide and precipitating the oxidized casein derivative formed by adding acid to the mass to impart an acid pH, such as 4.3, thereto.

Solution A was prepared consisting of 250 parts of a 10% solution of the modified casein in water, 141 parts of potassium bromide, 1.3 parts of potassium iodide and 1500 parts of water, all at a temperature of 60° C. and a pH of 6.0. Solution B was prepared by mixing together 170 parts of silver nitrate and 1800 parts of water, this solution having a temperature of 62° C. Solution B was run into agitated Solution A over a period of 10 minutes. The mass was then cooled immediately to 35° C. at a pH of 6.2. There was then added 16½ parts of 2 normal sulfuric acid which imparted a pH of 3, and the precipitate formed was allowed to settle and the liquid was decanted therefrom. There was then added 4000 parts of cold water, the grains were dispersed in the water with stirring for 5 minutes, the pH being 3.5, and then 1 part of 2.5 normal sodium hydroxide was added. The grains were allowed to settle and the liquid was decanted off. 12 parts of 2.5 normal NaOH was then added, which raised the pH from 3.9 to 7.6. The grains were dispersed for 35 minutes at 45° C. The pH was then adjusted to 7.5 with 2 normal sulfuric acid, and the final volume was adjusted to 1000 cc. of the dispersion per mol. of silver. The temperature was adjusted to 65° C. and 9 mg. of allyl thiourea per mol. of silver halide was stirred into the mass for 30 minutes at that temperature. The material was then cooled to 50° F. and mixed with a 5% solution of the ammonium salt of ethyl cellulose phthalate. This ethyl cellulose phthalate resulted from phthalylating a cellulose ether having an ethoxyl content of 45% to a phthalyl content of 15.4%. The mixing was carried out in a centrifugal mixer in the ratio of 1 part of the silver halide dispersion to 5 parts of the solution of ethyl cellulose ammonium phthalate, the mixed mass being at 50° F.

The cellulose ether phthalate emulsions prepared according to Examples 1 to 4 above can then be coated on the polystyrene film base in the conventional manner.

The polystyrene film base can be subbed beforehand according to the methods described in Examples A and B above, if desired.

Figure 2:
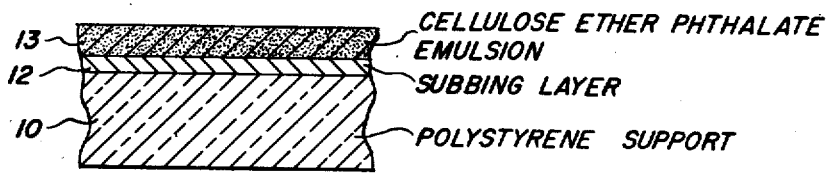

In the accompanying drawing, Fig. 1 is a cross-sectional view of a photographic element constructed according to our invention. As shown therein, a film support 10 of polystyrene, e. g. having the characteristics of grade 1 or grade 2 in Table A, has coated thereon a layer of a photographic emulsion 11, e. g. an ordinary gelatino-silver-halide emulsion. Fig. 2 is another example of a photographic element which can be prepared according to our invention. In Fig. 2 there is a film support 10 comprising polystyrene, e. g. polystyrene identified as grade 1 or grade 2 in Table A above, a subbing layer 12, e. g. prepared as described in Example A or Example B above, and a cellulose ether phthalate emulsion layer 13, e. g. prepared as described in Examples 1 to 4.

The photographic elements obtained according to our invention can be employed in any of the conventional photographic processes, such as color processes, motion picture processes, etc. However, they are particularly useful in photomechanical reproductions, such as in the preparation of color separation negatives. Polystyrene film supports other than those specifically illustrated herein can also be employed in preparing the photographic elements of our invention, provided they meet the minimum requirements for the birefringence test mentioned above. These birefringence measurements can, for example, be made as described in "Journal of Physical Chemistry," vol. 43 (No. 7, October, 1939), pp. 865–879 by John Spence, article entitled, "Optical Anisotropy and the Structure of Cellulosic Sheet Materials."

What we claim as our invention and desire secured by Letters Patent of the United States is:

1. A photographic element comprising at least one photographic silver halide emulsion layer and a support consisting essentially of polystyrene having a birefringence test such that $n_\gamma - n_\beta$ has a mean value of at least $+0.6$ $(10^{-3})$, $n_\beta - n_\alpha$ has a mean value of at least $-4.0$ $(10^{-3})$, and $n_\gamma - n_\alpha$ has a mean value of at least $-3.4$ $(10^{-3})$, said polystyrene being subbed by and in contact with a layer comprising a polymethacrylic resin.

2. A photographic element comprising at least one photographic gelatino-silver-halide emulsion layer and a support consisting essentially of polystyrene having a birefringence test such that $n_\gamma - n_\beta$ has a mean value of at least $+0.6$ $(10^{-3})$, $n_\beta - n_\alpha$ has a mean value of at least $-4.0$ $(10^{-3})$, and $n_\gamma - n_\alpha$ has a mean value of at least $-3.4$ $(10^{-3})$, said polystyrene being subbed by and in contact with a layer comprising a polymethacrylic resin.

3. A photographic element comprising at least one photographic silver halide emulsion layer and a support consisting essentially of polystyrene having a birefringence test such that $n_\gamma - n_\alpha$ has a mean value of at least $+0.6$ $(10^{-3})$, $n_\beta - n_\gamma$ has a mean value of at least $-4.0$ $(10^{-3})$, and $n_\gamma - n_\alpha$ has a mean value of at least $-3.4$ $(10^{-3})$, said polystyrene being subbed by and in contact with a layer comprising a polymethacrylic ester resin.

4. A photographic element comprising at least one photographic gelatino-silver-halide emulsion layer and a support consisting essentially of polystyrene having a birefringence test such that $n_\gamma - n_\alpha$ has a mean value of at least $+0.6$ $(10^{-3})$, $n_\beta - n_\gamma$ has a mean value of at least $-4.0$ $(10^{-3})$, and $n_\gamma - n_\alpha$ has a mean value of at least $-3.4$ $(10^{-3})$, said polystyrene being subbed by and in contact with a layer comprising a polymethacrylic ester resin.

5. A photographic element comprising at least one photographic silver halide emulsion layer and a support consisting essentially of polystyrene having a birefringence test such that $n_\gamma - n_\beta$ has a mean value of at least $+0.6$ $(10^{-3})$, $n_\beta - n_\alpha$ has a mean value of at least $-4.0$ $(10^{-3})$, and $n_\gamma - n_\alpha$ has a mean value of at least —3.4 ($10^{-3}$), said polystyrene being subbed by and in contact with a layer comprising a polybutyl methacrylate resin.

6. A photographic element comprising at least one photographic gelatino-silver-halide emulsion layer and a support consisting essentially of polystyrene having a birefringence test such that $n_\gamma - n_\beta$ has a mean value of at least $+0.6$ ($10^{-3}$), $n_\beta - n_\alpha$ has a mean value of at least $-4.0$ ($10^{-3}$), and $n_\gamma - n_\alpha$ has a mean value of at least $-3.4$ ($10^{-3}$), said polystyrene being subbed by and in contact with a layer comprising a polybutyl methacrylate resin.

7. A photographic element comprising in order a polystyrene support having a birefringence test such that $n_\gamma - n_\beta$ has a mean value of at least $+0.6$ ($10^{-3}$), $n_\beta - n_\alpha$ has a mean value of at least $-4.0$ ($10^{-3}$), and $n_\gamma - n_\alpha$ has a mean value of at least $-3.4$ ($10^{-3}$), a layer comprising a polymethacrylic resin, a layer comprising cellulose nitrate, and a photographic silver halide emulsion layer.

8. A photographic element comprising in order a polystyrene support having a birefringence test such that $n_\gamma - n_\beta$ has a mean value of at least $+0.6$ ($10^{-3}$), $n_\beta - n_\alpha$ has a mean value of at least $-4.0$ ($10^{-3}$), and $n_\gamma - n_\alpha$ has a mean value of at least $-3.4$ ($10^{-3}$), a layer comprising a polybutylmethacrylate, a layer comprising cellulose nitrate, and a photographic silver halide emulsion layer.

References Cited in the file of this patent
UNITED STATES PATENTS

| | | |
|---|---|---|
| 2,140,089 | Marasco | Dec. 13, 1938 |
| 2,382,806 | Motson | Aug. 14, 1945 |
| 2,481,770 | Nadeau | Sept. 13, 1949 |
| 2,725,293 | Talbot et al. | Nov. 29, 1955 |

OTHER REFERENCES

"Biaxially Oriented Methacrylate and Polystyrene Sheet," by C. Paul Fortner, pp. 493–495 in India Rubber World, January 1954.

Styrene by Boundy-Boyer 1952, Reinhold Publishing Corp., pg. 463 and pp. 1159–1160.

UNITED STATES PATENT OFFICE
Certificate of Correction

Patent No. 2,816,027                          December 10, 1957

Thomas H. Farrell et al.

It is hereby certified that error appears in the printed specification of the above numbered patent requiring correction and that the said Letters Patent should read as corrected below.

Column 9, line 31, after "768,480" and before the comma insert —(now U. S. Patent 2,691,582, issued October 12, 1954)—; column 10, lines 55 and 64, for "$n_\gamma - n_\alpha$", each occurrence, read —$n_\gamma - n_\beta$—; lines 56 and 65, for "$n_\beta - n_\gamma$", each occurrence, read —$n_\beta - n_\alpha$—.

Signed and sealed this 8th day of April 1958.

[SEAL]

Attest:
KARL H. AXLINE,
*Attesting Officer.*

ROBERT C. WATSON,
*Commissioner of Patents.*